March 24, 1936.  T. B. MÖNNICHE  2,035,139
FEEDING OF COFFEE
Filed Oct. 12, 1933
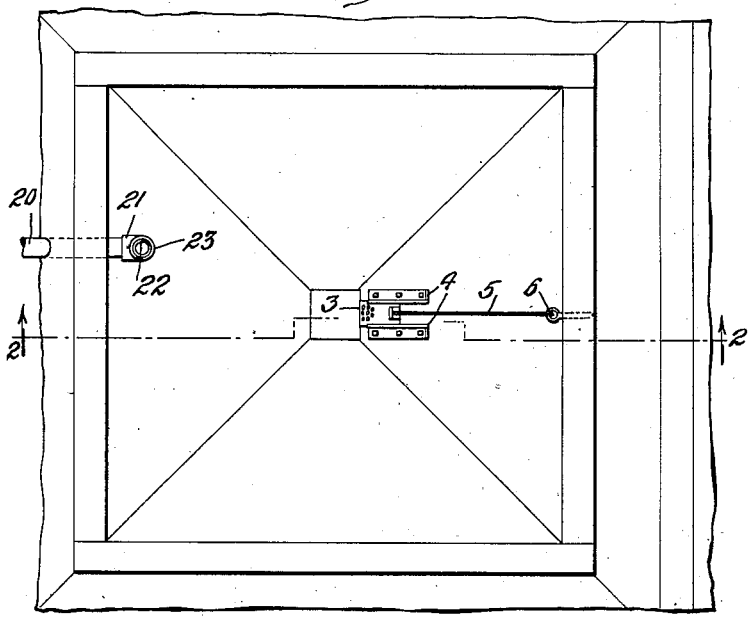
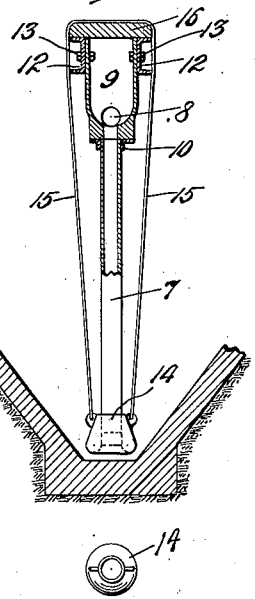
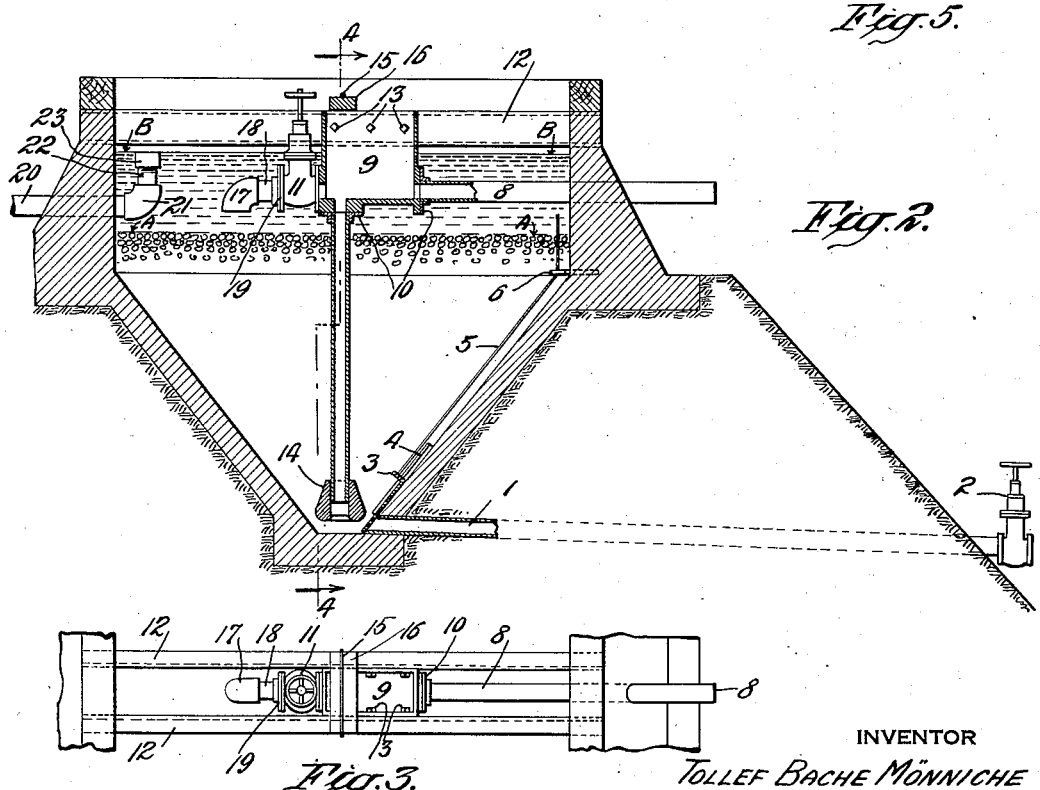
INVENTOR
TOLLEF BACHE MÖNNICHE
BY
E. C. Sanborn
ATTORNEY Patented Mar. 24, 1936

2,035,139

UNITED STATES PATENT OFFICE 2,035,139

FEEDING OF COFFEE

Tollef Bache Mönniche, Boquete, Panama

Application October 12, 1933, Serial No. 693,368

5 Claims. (Cl. 209—155)

This invention relates to the feeding of coffee to pulpers. An object of the invention is to provide for feeding a pulper with coffee to its full rated capacity, without over-feeding, and without requiring for this purpose any more water than the minimum amount requisite to the operation of the pulper. In this connection the invention comprises provisions for preventing clogging of the coffee feeding apparatus and for assuring a continuous and even flow of the coffee. The invention also provides for effectively regulating the quantity of coffee, and also the proportion of coffee to water, fed to the pulper. A further feature resides in provision for regulating an overflow means so that the latter may correspond with the water level necessary for the discharge of the desired amount of coffee and water. Other features and advantages of the invention will be hereinafter described and claimed.

In the accompanying drawing illustrating an embodiment of apparatus for carrying out the invention:

Figure 1 is a plan view of the hopper for the feeding apparatus with parts removed.

Figure 2 is a vertical section of the hopper and feeding means taken on line 2—2 of Fig. 1.

Figure 3 is a top view of the feeding means and its channel supports.

Figure 4 is a vertical section through the hopper and feeding means on line 4—4 of Fig. 2.

Figure 5 is a top view of the intake casting.

In the preparation and treatment of coffee, the coffee cherries as received from the pickers, are thrown into a hopper partially filled with water. The unripe cherries, over-ripe cherries, one bean cherries, black and imperfect bean cherries, together with the trash, float on the surface of the water and are either skimmed off or floated away through an overflow. The imperfect coffee cherries and light foreign matter are thus separated from the perfect coffee cherries. The ripe and perfect cherries, stones, and other foreign matter heavier than water, sink; the stones and other foreign matter remaining at the bottom of the hopper and the ripe and perfect cherries being discharged through a feeding means to the pulper. It is important that the pulper be fed with ripe cherries only, and also that the pulper be fed to its full rated capacity without being overfed. In case of overfeeding, the coffee fed to the pulper will overflow the hopper of the latter, and will go out with the pulp and thus be lost.

The hopper of the separating and feeding apparatus may be located obove the ground or, as shown in Figure 2, it may be positioned in an excavation on a side hill. The hopper is generally constructed of reinforced concrete. At the bottom the hopper is provided with an outlet pipe 1 to the lower end of which is attached a valve 2. At the upper end of pipe 1, a perforated gate 3 is placed with its two guides 4, 4, anchored into the concrete. A flexible wire 5 is attached to the flange of the gate. This wire, running through an eyebolt 6, may be fastened in any convenient manner (not shown) to the top of the hopper. The perforated gate may be raised or lowered by pulling or releasing the said wire. The purpose of the perforated gate is, when closed to prevent coffee from entering pipe 1, and, when raised, to allow sand, stones, or any foreign matter collected at the bottom of the hopper, to be flushed out by opening valve 2 for a few seconds. Valve 2 is also used for emptying the hopper when desired.

The feeding apparatus, as ordinarily constructed, consists of three principal parts—viz., an intake pipe 7, a discharge pipe 8, and a box 9, except that the valve shown at 11, together with the hole connecting the box with said valve, is omitted. The box 9 is generally provided at its outlet with a vertically sliding gate (not shown on this drawing), for the purpose of quickly shutting off the flow through the feeding apparatus whenever desired. Pipes 7 and 8 are connected to the box 9 by providing said pipes with pipe flanges 10, 10 and by bolting said flanges on to the box by means of threaded pins and nuts. The said box is bolted on to channels 12, 12, the ends of which are imbedded in the sides of the hopper, by bolts 13. Line A—A shows the maximum elevation to which coffee may be placed in the hopper, and line B—B shows the water level in the hopper while the feeding apparatus is functioning.

When functioning, a steady stream of water is discharged into the hopper; this discharge being regulated by a valve not shown in the drawing. The coffee and water thus flowing through pipe 7, pass through box 9, from which they are discharged through pipe 8. The feeding apparatus is commonly termed a siphon in this art, and the box 9 a "siphon box"; though it may be noted that as said box is open at its top, the functioning of this apparatus is not the same as that of a true siphon. It should be noted that only the water in the hopper is exerting pressure that produces flow through pipe 7, and that the coffee in the hopper is exerting no pressure increasing this flow; on the contrary, on account of the coffee being in the hopper, the flow through the feeding apparatus will be slightly decreased, due to the friction produced by water passing through the voids in the coffee. The coffee in pipe 7, due to being in suspension during flow, however, exerts counterpressure that decreases the flow, and the richer the mixture of coffee to water, the greater the counterpressure. The proportion of coffee to water usually used for feeding a pulper is about one part of coffee to three parts of water, this mixture having a specific gravity of about 1.01. By increasing this proportion, say by 25%, the specific gravity of such a mixture will be increased by only a small fraction of the order of thousandths, and thus it will be seen that the difference in counterpressures of these two mixtures in pipe 7 is very small. Consequently, to counteract, by raising the level of the water in the hopper, the counterpressure in pipe 7 produced by a mixture of coffee and water, the proportion of which has been increased by 25%, the water level in the hopper shall have to be raised by a very small amount. It is evident, therefore, that the controlling of the proportion of coffee to water passing through pipe 7 (or, in other words, the quantity of coffee discharged from the feeding apparatus) by changing of the water level in the hopper, requires the most exact and precise adjustment of said level. It is particularly difficult to maintain the water level in the hopper when receiving coffee while the feeding apparatus is functioning, if no overflow pipe has been provided for light cherries and trash. The amount of water discharged from the feeding apparatus is furthermore very difficult to ascertain beforehand. So far as I am aware, there are not sufficient engineering data available for solving this problem, and even if such data were available, the solving of this problem would involve the most complex calculations, and the results would moreover be inaccurate for pipes of standard sizes.

From the foregoing it is clear, that by raising the water level in the hopper, the proportion of coffee to water flowing through pipe 7 increases, the maximum proportion being approximately one part coffee to one-half part water. The water level in the hopper, at which the maximum proportion of coffee to water is obtained in pipe 7, will be referred to hereinafter as the "critical elevation". As the proportion of coffee to water remains at its maximum if the water level in the hopper be raised above the critical elevation, the quantity of coffee passing through pipe 7 will increase very nearly in direct proportion to the square root of the increased height of the water level in the hopper; and therefore, above the critical elevation, a slight difference in the water level in the hopper will cause a still slighter difference in the discharge of coffee. It should also be noted, that the functioning of the apparatus depends upon obtaining the proper distance from the bottom of the hopper to the intake, or to the end of pipe 7. It is desirable to have this distance as small as possible in order to be able to discharge as much coffee from the hopper as possible; but it often happens that this distance has been made so small that pipe 7 will be clogged with coffee, and therefore the said pipe has to be cut off higher up in order to minimize the chances of clogging.

When siphons or feeding means of the type aforesaid have been provided with pipes so small that the water level in the hopper had to be raised to, or above, the critical elevation in order to obtain the required discharge of coffee, such feeding means, if not clogging at the intake pipe, become clogged at the outlet of the box 9, on account of the mixture of coffee to water being too rich to flow out of said box. Such feeding means could, therefore, only be operated after the water in the hopper had been lowered, resulting in a discharge of coffee below the required amount for feeding the pulper to its rated capacity.

On the other hand, when such feeding means heretofore constructed were provided with pipes so large that the water level in the hopper could remain below the critical elevation to obtain the required discharge of coffee, such feeding means generally required a great surplus of water to function. As the proportion of coffee to water flowing through a feeding means of this kind varies greatly with the slightest variation of the water level in the hopper, as previously explained, the pulper may be easily overfed, and if this should occur, the discharge from the feeding means or siphon would have to be stopped immediately by lowering the aforementioned sliding gate provided in the siphon box 9 for this purpose, and the water level in the hopper would have, by some means, to be lowered to its proper level before the feeding means could again be allowed to function. It may appear that the flow through the siphon migh be regulated by the raising and lowering of the sliding gate; but this is not the case, because when the gate is manipulated, coffee is apt to clog the outlet of the siphon box, and thus an uneven discharge of coffee and water will result. In order to prevent interruptions in the functioning of such siphons or feeding means, they also had to be operated with a water level so low that the discharge from the siphon was below the rated capacity of the pulper.

It may thus be seen, that no matter what size pipes were used for siphons as heretofore constructed, the discharge of coffee was always below the required amount for feeding a pulper to its full rated capacity, and the amount of water required for their functioning was very problematical; and as the water supply for many plantations is a serious problem, it is of the utmost importance, in the first place, to obtain a feeding means that may be operated with a minimum amount of water, and in the second place, to know beforehand the quantity of water required for operating such a feeding means.

The aforesaid siphons or feeding means heretofore constructed have usually been provided with larger intake and discharge pipes than necessary, thus using a great surplus of water for obtaining the discharge of coffee required. On this account the installation of said feeding means heretofore has been limited to those localities only where a large amount of water has been available; and even in such localities their use has been very limited on account of their deficiencies, although their superiority over any known device for separating sand, stones, trash, over-ripe and unripe coffee cherries from ripe and perfect coffee cherries is universally recognized. Siphons or feeding means provided with the improvements of this invention may be installed at any locality where there is no more water available than what is just necessary for operating a pulper.

One of the features of my invention consists in providing the intake pipe 7 with a casting 14, having two ears or ribs opposite each other, each ear having a hole; one end of the flexible wire 15 is passed through one of these holes and fastened; the other end of said wire is carried up to and over the channels 12, 12 and down to the other ear, through the hole of which the other end of said wire is passed and then fastened. The casting 14 is conical in shape, the larger diameter being at the bottom, and through the center of its axis said casting is provided with a hole slightly larger than the outer diameter of pipe 7. This hole is flared out at the bottom, and the lower and outer edge of said casting is rounded off in such a manner as to form streamlines with the flaring hole, thus facilitating the flow of coffee and water entering pipe 7. To insure an even and continuous flow of coffee and water through pipe 7, the said casting can be adjusted to its proper height above the bottom of the hopper by blocking wire 15 up on top of channels 12, 12. When the proper height of the said casting has been ascertained by tests, a permanent block 16 may be placed under the wire. When nearly all of the coffee above the bottom of said casting has been discharged, the casting can be lowered to within the distance of the size of a coffee cherry by removing block 16, and by replacing said block with a smaller block. Thus practically all the coffee in the hopper may be discharged.

In case a large nail, teaspoon, or any other obstruction should clog the intake, or in case the coffee, for some unforeseen reason, has had to remain in the hopper so long that the coffee has formed a more or less sticky mass that will not discharge through the siphon, the casting 14 can be quickly and easily lifted and lowered again by pulling the wire 15 out sideways on each side of the siphon box and then releasing said wire. The pull on the wire required for lifting the casting 14, is very small, because the force thus exerted upon the casting is many times greater than the pull on the wire, due to the casting being subjected to the same force as that exerted by a toggle joint. In the case of an obstruction having lodged against the intake, the lifting and lowering of the casting will cause the obstruction to drop below the casting; and in the case of the coffee having formed a sticky mass, this mass will, by the lifting and lowering of the casting, be broken up, and a flow of coffee and water through pipe 7 will be established.

Regarding the usual tendency of coffee clogging the intake pipe, it should be noted, that by providing pipe 7 with casting 14, the coffee below this casting will not be subjected, as will the coffee above this casting, to the pressure of the coffee cherries upon each other, said pressure being exerted by the weight of the overlying coffee cherries minus their buoyancies. The coffee below the casting will be subjected to practically water pressure only, and it will thus be brought in suspension as soon as the flow of water through pipe 7 is sufficiently strong to do so. In this manner, the coffee below the casting will be carried away through pipe 7, and the coffee above the casting will drop down to replace the coffee carried away, wherefore a clogging of the intake is prevented, and a continuous and even flow of coffee and water through pipe 7 is assured.

Another feature of the invention (see Figures 2 and 3) consists in providing the valve 11, which may be bolted on to the siphon box 9 by threaded pins and nuts in the same manner as is done for pipe flanges 10, 10. Elbow 17 with nipple 18 and the latter's pipe flange 19 are bolted to valve 11 by bolts and nuts.

In Figure 2 and Figure 3, valve 11 is shown as connected to the siphon box 9, but the same results for regulating the flow of coffee and of water, may be obtained by connecting a water intake having a valve, or any other device for regulating the flow of water, to any part of the siphon or feeding apparatus through which coffee is flowing.

Suppose that the water level in the hopper has reached or passed above the critical elevation, and that the quantity of coffee flowing through pipe 7 would be more than the required amount, the flow of coffee may be reduced to the required amount by opening valve 11, because by so doing the water level in the siphon box will be raised and consequently the counter pressure in pipe 7 will be increased. In case the water thus discharging from the siphon should be less than the required amount, the water level in the hopper may be raised, and valve 11 adjusted until the proper amount of coffee is being discharged. If necessary, the raising or lowering of the water level in the hopper in conjunction with the manipulation of valve 11 may, of course, be repeated until the required amount of coffee and water discharging from the siphon is accurately obtained.

A further feature of the invention consists in providing the hopper with an overflow made of pipe 20, and pipe fittings 21, 22, and 23. The nipple 22 is threaded for nearly its whole length above elbow 21 with threads so deep that the collar 23 may be easily screwed down by hand for nearly its whole length on nipple 22. By manipulating collar 23 the elevation of the outlet for light coffee cherries and trash can be accurately adjusted to correspond with the water level required for the discharge of the desired amount of coffee and water.

As a siphon or feeding apparatus provided with the improvements of this invention can be accurately adjusted, within reasonable limits, to whatever discharge of coffee or water desired, the size of pipes used for a siphon of this kind is of minor importance; and thus the great difficulties of determining beforehand the proper sizes of pipes, previously referred to, for ordinary siphons, are avoided.

In case a siphon provided with the improvements of this invention should overfeed a pulper, there is no necessity for interrupting the functioning of the siphon, as there is with an ordinary siphon, because the discharge of coffee may be immediately reduced by slightly opening valve 11. The chances for overfeeding the pulper have been found in actual practice, however, to be extremely slight, so that a siphon of this kind may be safely operated with a discharge of coffee equal to the full rated capacity of the pulper.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In apparatus for treating coffee, means comprising a water-containing receptacle for receiving coffee and separating the good cherries from associated material, means providing a conduit for the discharge of said cherries from said receptacle under the pressure of the water therein, and means for establishing communication between said water and said conduit at a point removed from that at which said cherries enter said conduit, to thereby regulate the rate of discharge of said cherries from said conduit.

2. In apparatus for treating coffee, means comprising a water-containing receptacle for receiving coffee and separating the good cherries from associated material, means providing a conduit for the discharge of said cherries from said receptacle, said means comprising a box and an intake pipe extending therefrom to a point adjacent the botom of said receptacle, and valve means for establishing in said conduit means a pressure opposing flow of said cherries therethrough to regulate the rate of discharge of said cherries from said receptacle.

3. In apparatus for the treatment of coffee, means comprising a water-containing receptacle for receiving coffee and separating the good coffee cherries from associated material, an intake feed pipe extending downwardly in said receptacle, a sleeve element surrounding the lower end of said pipe, and means enabling said element to be raised or lowered to regulate the distance between said element and the bottom of said receptacle, the outer and lower edge of said sleeve element being rounded and the lower interior portion of said element being flared.

4. In apparatus for the treatment of coffee, means comprising a water-containing receptacle for receiving coffee and separating the good coffee cherries from associated material, an intake feed pipe extending downwardly in said receptacle, a sleeve element surrounding the lower end of said pipe, and means enabling said element to be raised or lowered to regulate the distance between said element and the bottom of said receptacle, said sleeve element being conical in form with its outer and lower edge rounded and its lower interior portion flared.

5. The method of treating coffee comprising subjecting good cherries and attendant material to a water bath for causing undesirable matter lighter than the water to float on the surface thereof and thereby to separate from the good coffee cherries beneath said surface, conducting said cherries beneath said surface to a point outside of said receptacle under the pressure of the water in said receptacle, and regulating the discharge of said cherries by raising or lowering the water level in said receptacle and producing a counter-pressure opposing said discharge to obtain a desired discharge rate of said cherries in a given proportion to water.

TOLLEF BACHE MÖNNICHE.